United States Patent [19]
Hermanns et al.

[11] Patent Number: 5,231,772
[45] Date of Patent: Aug. 3, 1993

[54] APPARATUS AND PROCESS FOR RECOVERING SOLVENTS

[75] Inventors: Klaus Hermanns, Hünxe; Gerhard Kusenberg, Wesel; Norbert Hagenbruck, Essen; Michael Karthaus, Neuss, all of Fed. Rep. of Germany

[73] Assignees: Herco-Kuhltechnik Hermans & Co.; Air Products GmbH, Werk Hattingen, both of Fed. Rep. of Germany

[21] Appl. No.: 860,288

[22] Filed: Mar. 20, 1992

Related U.S. Application Data

[63] Continuation of Ser. No. 580,787, Sep. 11, 1990, abandoned.

[30] Foreign Application Priority Data

Sep. 11, 1989 [DE] Fed. Rep. of Germany ....... 3930238
Nov. 6, 1989 [DE] Fed. Rep. of Germany ....... 3936834

[51] Int. Cl.$^5$ ............................................... F26B 3/00
[52] U.S. Cl. ........................................ 34/26; 34/32; 34/72; 34/74; 34/60; 62/11; 62/18; 62/40
[58] Field of Search ................... 34/60, 62, 72-75, 34/77, 78, 155, 156, 26, 32; 62/11, 18, 40, 82, 234, 54

[56] References Cited

U.S. PATENT DOCUMENTS

| | | | |
|---|---|---|---|
| 3,501,921 | 3/1970 | Muenger et al. | 62/13 |
| 3,501,923 | 3/1970 | Lehmer | 62/18 |
| 3,609,983 | 10/1971 | Lofredo et al. | 62/18 |
| 3,854,914 | 12/1974 | Leyarovski et al. | 62/18 |
| 4,026,035 | 5/1977 | Dyer et al. | 34/23 |
| 4,053,990 | 10/1977 | Bielinski | 34/156 |
| 4,122,684 | 10/1978 | Clarkson et al. | 62/54 |
| 4,370,357 | 1/1983 | Swartz | 34/78 |
| 4,469,720 | 9/1984 | Morris | 34/73 |
| 4,901,533 | 2/1990 | Fan et al. | 62/11 |
| 4,926,567 | 5/1990 | Ogawa | 34/23 |
| 5,083,440 | 1/1992 | Karthaus et al. | 62/282 |

FOREIGN PATENT DOCUMENTS

| | | |
|---|---|---|
| 0124997 | 11/1984 | European Pat. Off. . |
| 1032218 | 11/1958 | Fed. Rep. of Germany . |
| 1419190 | 11/1968 | Fed. Rep. of Germany . |
| 38161B | 11/1984 | Fed. Rep. of Germany . |
| 8816558 | 11/1989 | Fed. Rep. of Germany . |

OTHER PUBLICATIONS

BASF publication (Jul. 1989) JWF, entitled "Recovery of Organic Solvents from Off-Gas Streams (Review)", TI-CIW/ES 014 e, pp. 16-19.

*Primary Examiner*—Henry A. Bennett
*Assistant Examiner*—Denise L. Gromada

[57] ABSTRACT

A solvent recovery apparatus, in particular, for manufacturing apparatus of web-like materials, preferably sound tapes and video tapes, is equipped with a heat exchanger which returns a preferably larger portion of a gas prepurified of solvents downstream of a solvent separator via a line and heats it against the flow of the solvent-charged gas from the drier in order to return the preheated larger portion into the drier; a preferably smaller portion of the prepurified gas is freed from remaining solvent residues downstream of the solvent separator in a cryogenic apparatus, supplemented with a thereby vaporized part of inert gas in order to subsequently be supplied to transfer chambers of the drier to produce there a positive gas flow directed both into the drier and to the outside. The proposed method can be carried out on the apparatus describe.

10 Claims, 3 Drawing Sheets

APPARATUS AND PROCESS FOR RECOVERING SOLVENTS

This application is a continuation of application Ser. No. 07/580,787 filed Sep. 11, 1990, now abandoned.

BACKGROUND OF THE INVENTION

1. Field of the Invention

The present invention relates to an apparatus as well as a process for recovering solvents, in particular, for manufacturing apparatuses of web-like materials, preferably sound tapes and video tapes.

In modern manufacturing plants there frequently is a need of purifying solvent-contaminated gases with inert gases, in particular, with liquid nitrogen. The transition into the liquid phase of the solvent to be condensed out is usually above the vaporization curve of liquid nitrogen. This may involve substantial functional difficulties, in particular, in the control of the outlet temperature of the carrier gas.

2. Description of the Prior Art

From German Patent Specification 1 032 218 there are known a method and an apparatus for the fractionated condensation of chemical vapor mixtures, which are treated in condensation vessels connected stage by stage with each other. In each condensation stage an intermediate medium is used between the actual cooling medium, that is air, and the vapor mixture to be fractionated. All of the chemical vapor mixtures mentioned there can be fractionated at relatively high temperatures. The possibly present residual gas, e.g. air or an inert gas, which has to be purified, contains a high amount of residues of the chemical vapor mixture to be fractionated.

From German Offenlegungsschrift 1 419 190 there are likewise known a method as well as an apparatus for condensing chemical vapor mixtures. There, too, chemical vapor mixtures boiling at relatively high temperatures are condensed by means of air cooling and an intermediate medium in such a way that, for one thing, the condensate does not freeze out, but, for the other, condensation is as substantial as possible. This published patent application predominantly deals with the control of the pertinent parameters.

From European Patent Specification 0 124 997 corresponding to U.S. patent application Ser. No. 481,177 there is known a method of recovering solvent vapor using an inert gas circuit for baking solvents out of a product within an oven, for one thing, and a cryogenic apparatus supplying transfer chambers belonging to the oven, for the other. Here, the inert gas circulation is a closed circuit, supplying the oven, after the inert gas, in general nitrogen, has been liberated from all solvents as required by safety regulations. The gaseous nitrogen which is produced by the purification of the inert gas is used for the supply of the transfer chambers which are adapted in such a way that no gas exchange takes place between the inert gas circuit and the oven.

In the method according to European Patent Specification 0 124 997 a relatively high amount of energy is necessary to recover the solvents and to maintain in the oven the temperature necessary for curing the products and/or for vaporizing the solvents from the products.

SUMMARY OF THE INVENTION

The invention has as its object to propose an apparatus and a process for recovering solvents, which substantially obviate the disadvantages of the prior art and, in particular, involve a smaller amount of energy accompanied by a highly efficient solvent recovery rate. Said object is solved by a solvent recovery apparatus, in particular, for manufacturing apparatuses of web-like materials, preferably sound tapes and video tapes, comprising a drier for the removal of solvents from an (intermediate) product by using an inert gas, in particular, nitrogen; at least one inlet transfer chamber and at least one outlet transfer chamber for the drier; a heat exchanger in which the solvent-charged gas is precooled; a condenser in which precooled gas is freed from the majority of the solvent; a solvent separator (26) a cryogenic apparatus which is operated with a liquid, inert gas, in particular, liquid nitrogen, wherein a preferably larger portion of the inert gas, in particular, nitrogen is recirculated into the heat exchanger downstream of the solvent separator via a line and is heated against the flow of the gas from the drier in order to subsequently resupply the larger portion into the drier; and wherein a preferably smaller portion of the gas is supplied into the cryogenic apparatus downstream of the solvent separator to be freed from solvent residues, to be supplemented at least partially with some vaporizing portion of an inert gas, in particular, nitrogen, to subsequently produce in the transfer chambers a positive gas flux both to the interior of the drier and to the outside.

Furthermore, said object is solved by a process for the recovery of solvents, in particular, for manufacturing apparatuses of web-like materials, preferably sound tapes and video tapes, in which a solvent-charged gas is withdrawn from a drier, the solvent-charged gas is prepurified of solvents and the prepurified gas is resupplied to the drier, wherein the gas resupplied to the drier corresponds to a larger portion of the gas withdrawn from the drier; a smaller portion of the withdrawn and prepurified gas is additionally purified in a cryogenic apparatus, and is mixed with an inert gas, in particular, nitrogen not yet used in the drier, wherein the gas mixture of cryogenically purified gas and non-used gas is supplied to transfer chambers disposed upstream and downstream of the drier, and wherein due to the difference between the gas withdrawn from the drier and the resupplied larger portion a positive mass flow out of the transfer chambers and both into the drier and into the external atmosphere is adjusted, which essentially corresponds to the cryogenic, purified smaller portion.

According to the invention in a heat exchanger a preferably larger portion of a gas, which is resupplied downstream of a solvent separator via a line, is heated against the gas flow from a drier. The heated gas is then resupplied to the drier, making it thus possible to maintain the necessary drying temperatures in the drier without requiring a large amount of energy.

The preferably smaller portion of the gas is supplied into a cryogenic apparatus downstream of the solvent separator in order to extract any solvent residues. Subsequently, the smaller portion is supplemented at least with part of the inert gas vaporized thereby to generate the low temperatures in the cryogenic apparatuses, in order to subsequently produce a positive flow in the transfer chambers both to the inside into the drier and to the outside. In this connection, the discharged smaller portion of the gas downstream of the solvent separator corresponds to the positive flow from the transfer chambers into the drier. This guarantees that the inert gas circuit supplying the drier with gas is screened against the outside and at the same time is permanently supplemented by very pure gas. This in turn increases the drying intensity in the drier.

A condenser connected downstream of the heat exchanger is responsible for precipitating the main portion of the solvent from the drying gas coming from the drier. The condenser is usually supplied with external refrigeration from a refrigerating machine. The two-phase mixture existing in the condenser—liquid solvent/essentially purified nitrogen—is separated in the solvent separator.

The recovered solvent is intermediately stored in a vessel and supplied to a tank storage by means of a pump.

A special aspect of the invention resides in the fact that the cryogenic apparatus is used for further processing and/or further purification of, in particular, the smaller portion of the gas discharged behind the solvent separator. For this purpose, in the cryogenic apparatus liquid nitrogen is used from a tank. The cryogenic apparatus comprises a first heat exchanger in which the enthalpy necessary for vaporizing the liquid nitrogen and for heating the vaporized nitrogen is withdrawn from a liquid refrigerant. Moreover, there exists a second heat exchanger which withdraws the enthalpy necessary for re-heating the refrigerant from the solvent-charged gas which is thus cooled down to a required predetermined temperature. Finally, the cryogenic apparatus comprises a carrier circuit which allows the refrigerant to circulate between the first and the second heat exchangers.

The carrier circuit may consist of an enclosed container or vessel essentially including the first and second heat exchangers.

In a particularly advantageous embodiment the refrigerant may essentially cover and/or surround the second heat exchanger through which the gas charged with solvent residues is supplied.

It is particularly advantageous if the enthalpy necessary for vaporizing the liquid nitrogen coming from the tank is withdrawn from the refrigerant by means of condensation and the thus liquefied refrigerant is evaporated again by the carrier gas by means of taking up enthalpy therefrom, whereby the carrier gas is cooled down to the required, predetermined temperature.

Thus it is possible to remove the solvent residues from the smaller portion of the drying gas and, despite using a refrigerant dispenser with temperatures having the solvent to be precipitated into the solid phase, to cool the solvent to be precipitated to a temperature somewhat below its condensation temperature, so that it remains flowable.

Due to the use of such a self-regulating refrigerant circuit it is possible to do without additional pumps.

The exit temperature of the refrigerant from the first heat exchanger is kept constant or nearly constant by controlling the supply of the liquid nitrogen.

The temperature of the exiting carrier gas is kept constant or nearly constant by controlling the throughput of the refrigerant.

The temperature of the carrier gas exiting from the second heat exchanger is kept constant or nearly constant by controlling the supply of liquid nitrogen in the first heat exchanger. Circulation of the liquid refrigerant may also be effected by thermal buoyancy.

Freons such as R12 and R22 may advantageously be used as refrigerants.

BRIEF DESCRIPTION OF THE DRAWINGS

Below the method and the apparatus according to the invention are described by reference to the enclosed figures. Further advantages and features according to the present invention will be disclosed. In the FIGURES.

DESCRIPTION OF PREFERRED EMBODIMENTS

Figure 1:
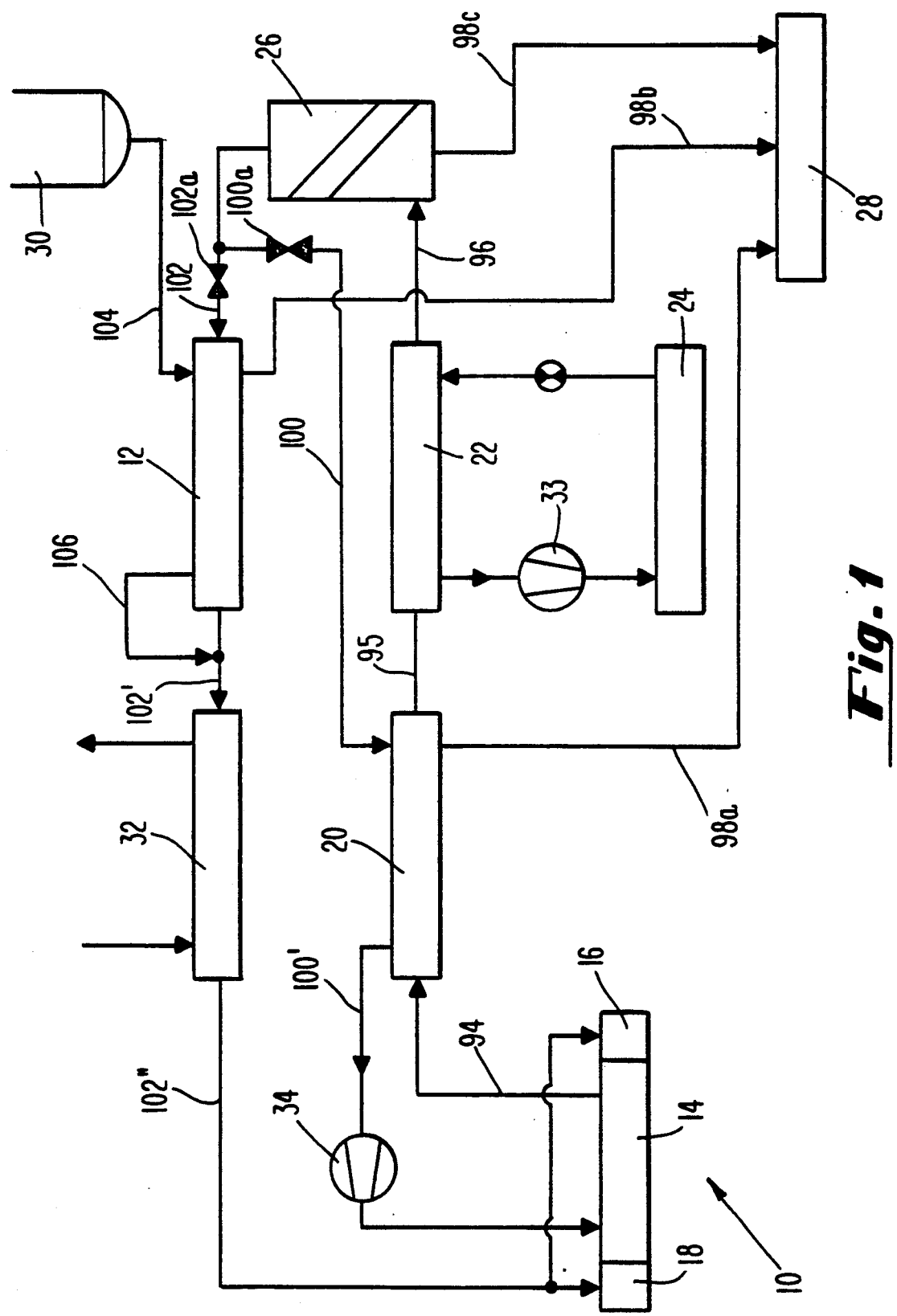
FIG. 1 shows a schematic representation of a solvent recovery apparatus according to the invention.

In FIG. 1 the solvent recovery apparatus according to the invention is characterized generally by reference numeral 10.

A drier 14 is provided with an inlet transfer chamber 18 and an outlet transfer chamber 16. The drier 14 is charged e.g. with web-like material via the inlet transfer chamber 18, which material again leaves the drier through the outlet transfer chamber 16. During its presence in the drier 14 solvent residues are removed from the product to be processed.

The drier 14 is connected to a heat exchanger 20 via a line 94. The heat exchanger 20 again is connected to a condenser 22 via a conduit 95. The solvent condensed in the heat exchanger 20 is supplied into a solvent tank 28 via a conduit 98a.

The condenser 22 is connected to an external refrigerating machine 24 holding the condenser at a predetermined temperature and/or within a predetermined temperature range. The condenser 22 is connected to a solvent separator 26 via a conduit 96.

In the solvent separator 26 a two-phase mixture consisting of the liquid solvent and the purified drying gas, in particular, nitrogen is separated. The liquid solvent is likewise supplied into the storage tank 28 via a conduit 98c. The essentially purified drying gas, namely nitrogen, is discharged from the solvent separator 26.

This gas is divided into a larger portion and a smaller portion via two conduits 100, 102 and/or via two valves 100a, 102a. The smaller portion is further supplied to a cryogenic apparatus 12 via a conduit 102. The larger portion is resupplied to the heat exchanger 20 via a conduit 100. Accurate fine adjustment of the quantitative amounts of the smaller and larger portions is effected via the valves 100a, 102a.

The larger portion of the resupplied, purified drying gas is heated in the heat exchanger 20 against the drying gas heavily contaminated with solvents, which gas was just carried out of the drier 14, whereby the drying gas heavily charged with solvents is precooled. The heated larger portion of the drying gas and/or nitrogen is supplied into the drier 14 via a conduit 100' and a supply means 34 and is used there again.

Figure 2:
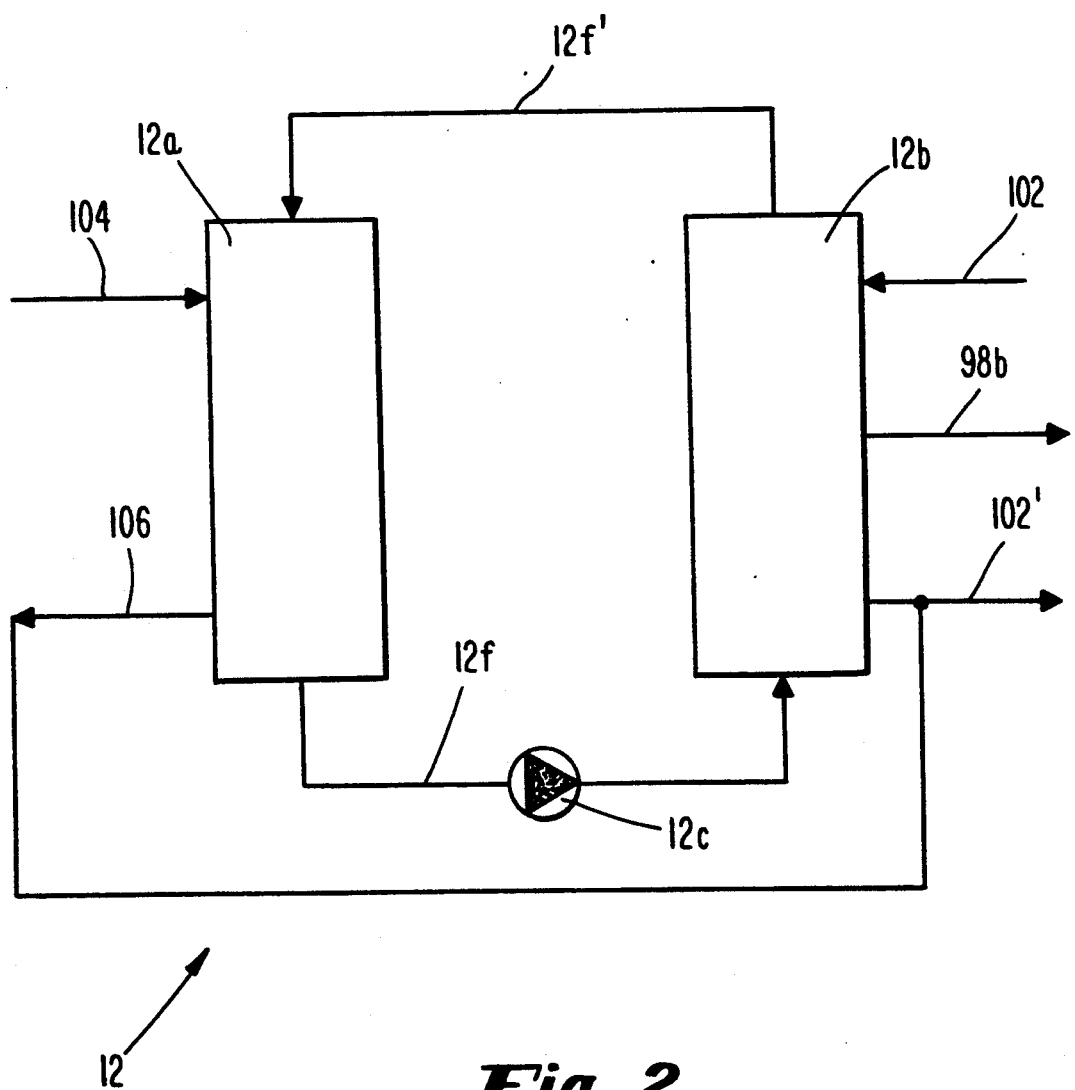
FIG. 2 shows a basic representation of a cryogenic part according to FIG. 1.
Figure 3:
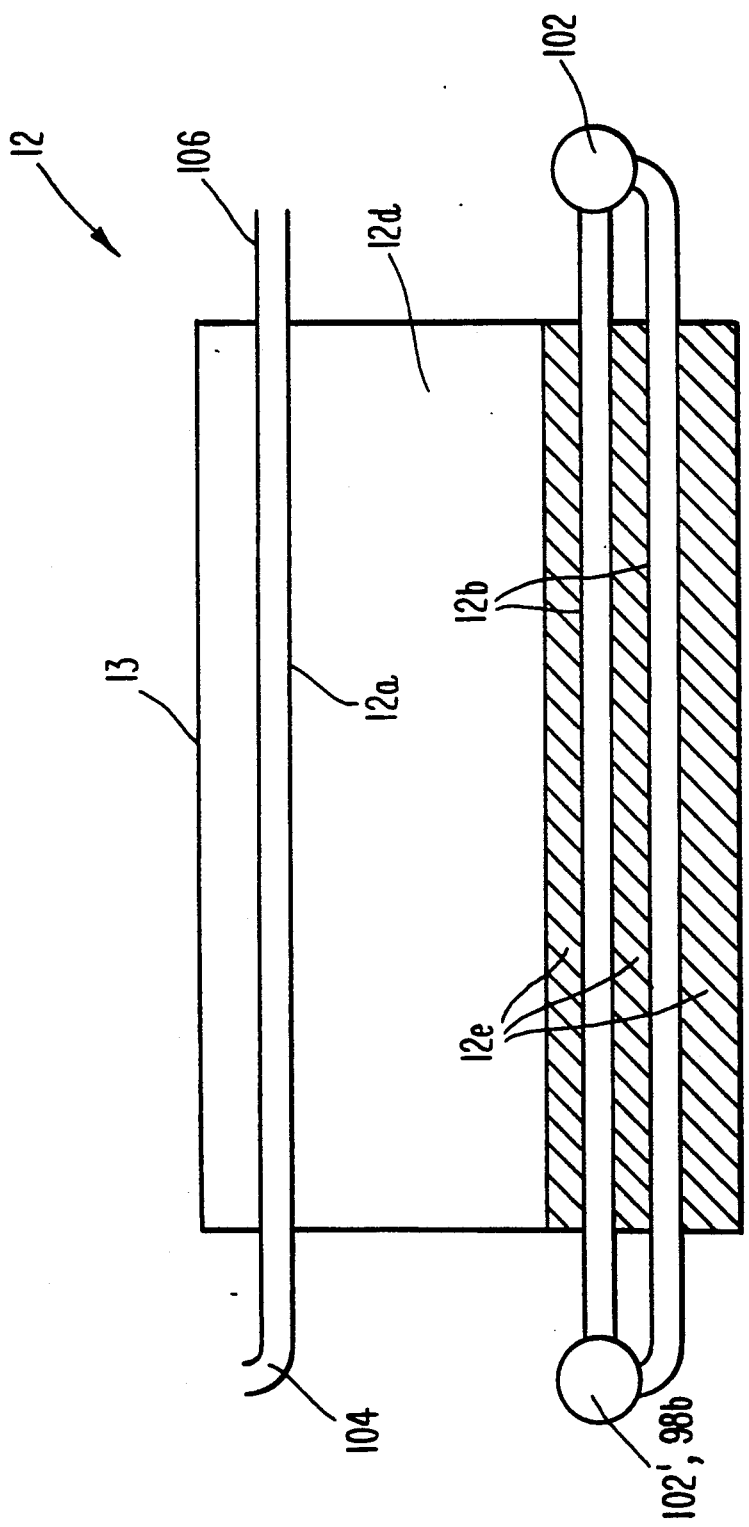
FIG. 3 shows a cryogenic apparatus according to the invention as can be used in a solvent recovery apparatus according to the invention as shown in FIG. 1.

Since with respect to FIGS. 2 and 3 the cryogenic apparatus 12 is to be dealt with separately, it is to be mentioned here only insofar as reference is made to the fact that for further purification of the smaller portion of drying gas introduced via the conduit 102 liquid nitrogen is supplied from a storage tank 30 via a conduit 104. An exchange of heat will then take place in the cryogenic part, the solvent residues being condensed out of the smaller portion. Said solvent residues are supplied into the tank 28 via a conduit 98b. The amount of liquid nitrogen from the tank 30 evaporated due to the exchange of heat is fed into a conduit 102' via a conduit 106, which conduit 102' carries the pure smaller portion of the drying gas and/or nitrogen out of the cryogenic part 12. In a heat exchanger 32 connected downstream of the cryogenic apparatus 12 the resulting gas stream is preheated before it is supplied into the chambers 16, 18 via conduits 102''.

The fact that a certain amount, i.e. the smaller portion, is permanently withdrawn from the resupplied drying gas (nitrogen) will automatically cause a partial vacuum in the drier 14. Said partial vacuum corresponds to just the withdrawn smaller portion which is supplemented by the nitrogen evaporated in the cryogenic apparatus 12 and derived from the storage tank 30. This results in a positive mass flow both into the interior of the drier and into the external atmosphere, so that it is guaranteed that, for one thing, no ambient air reaches the drier 14 and, for the other, no solvent leaves the drier 14. Moreover, the permanent supplementation with nitrogen not yet used allows one to achieve even better drying effects in the drier 14.

The solvent recovery apparatus according to the invention operates as follows: A product to be dried is fed through the drier 14 as well as the chambers 18, 16. The hot drying atmosphere in the drier 14 ensures that the excess solvent is removed from the product. The solvent-charged drying gas, hereinafter simply called nitrogen, is supplied from the drier 14 into the heat exchanger 20 and is precooled there. High-boiling solvent components are condensed already partially. The main purpose of the heat exchanger, however, is the heat recovery. Having been precooled and freed from high-boiling components the nitrogen leaves the condenser 20 and arrives at a further heat exchanger 22 in which the main portion of solvent is condensed out of the nitrogen against external refrigeration supplied by an external refrigerating machine 24.

As a result of the refrigeration the gas mixture in the heat exchanger 22 is split up into a two-phase mixture consisting of liquid solvent and purified nitrogen and separated in a solvent separator 26.

The purified nitrogen flows out of the solvent separator 26 and subsequently is divided into a larger portion and a smaller portion. Valves 100a, 102a are available for exact dosing.

The larger portion of the purified nitrogen is supplied via the conduit 100 into the heat exchanger and/or precooler 20 so as to be heated there. The fan 34 sucks off the nitrogen and feeds it back into the drier 14. For the purpose of further purification the smaller portion of the purified nitrogen is supplied into the cryogenic drier via the valve 102a and the conduit 102, where a cryogenic purification process takes place. This is described in more detail referring to FIGS. 2 and 3.

The extremely pure nitrogen leaves the cryogenic apparatus 12 via the conduit 102' and at least partially joins the non-used evaporated nitrogen produced by the cryogenic purification process via a conduit 106; then it is mixed therewith and fed to a heat exchanger 32 in which the nitrogen is heated before it is introduced into the chambers 18, 16 via a further conduit system 102''. As pointed out above, a curtain is created by the nitrogen supply to the transfer chambers 16, 18 so as to prevent oxygen from penetrating into the drier 14 and solvent from leaving the drier. From this nitrogen curtain there is derived a positive nitrogen flow into both the drier 14 and the external atmosphere. The required flush nitrogen is taken from the tank 30. To guarantee a positive flow from the transfer chambers 16, 18 into the drier 14 the inert gas circuit is constantly drained of nitrogen, the smaller portion, downstream of the separator 26. In the solvent recovery apparatus according to the invention the cryogenic apparatus 12 constitutes a particularly critical component.

Usually the refrigerant supplier is liquid nitrogen having a boiling temperature of $-195.75°$ C. (77.4 K) and an evaporation enthalpy of 201 kJ/kg. The specific heat capacity of the gaseous nitrogen amounts to only 1.038 kJ/kg °K., so that about $\frac{1}{2}$ of the refrigeration necessary for cooling the carrier gas to about $-100°$ C. have to be transferred at nitrogen temperatures of $-195.75°$ C. This gives rise to two major problems:

1. Control of the amount of liquid nitrogen necessary for cooling the carrier gas solvent mixture, and
2. avoiding sublimation of solvents in the cryogenic condenser.

This danger exists for almost for all solvents and the higher the melting point of the solvent the larger it is.

Both problems can be solved by means of interconnecting a heat (refrigeration) carrier circuit of a heat capacity as high as possible, as is described in more detail below. In FIG. 2 an arrangement for a cryogenic apparatus according to the invention is generally characterized by reference numeral 12. Here, first of all, a liquid refrigerant, e.g. Freons such as R12 or R22, is cooled down to a given temperature (e.g. $-140°$ C.) by means of an evaporating nitrogen. The refrigerant is supplied with the help of a pump 12c to a second heat exchanger 12b, in which the carrier gas is cooled down to a predetermined temperature. Controlling the exit temperature can be achieved by means of controlling the amount of refrigerant and/or by controlling the supply of liquid nitrogen. In the case of a sufficient thermal buoyancy force the pump 12c can be dispensed with to allow the refrigerant to circulate in the refrigerant circuit 12f.

The liquid nitrogen is fed into the heat exchanger 12a via the conduit 104. In the heat exchanger 12a the liquid nitrogen withdraws heat from the refrigerant circulating in the line system 12f and vaporizes thereby. The vaporized nitrogen leaves the heat exchanger 12a via the conduit 106 and is introduced into the conduit 102'. Normally such introduction is effected at least in part in order to maintain the cited positive flow in the chambers 16, 18 in both directions.

The cold carrier medium is supplied into the heat exchanger 12b by the pump 12c, if necessary, via a line and/or conduit 12f. In the heat exchanger 12b the intermediate carrier medium takes up heat from the smaller portion of the purified nitrogen, whereby solvent residues remaining in the purified nitrogen condense. The condensed solvent residues are supplied to the storage tank 28 via a conduit 98b.

The heated intermediate carrier medium is again resupplied from the heat exchanger 12b into the heat exchanger 12a via the upper line 12f.

A further form of embodiment of a cryogenic apparatus 12 can be gathered from FIG. 3. Here, the cryogenic apparatus 12 consists of a container and/or vessel in which the heat exchanger 12a and the heat exchanger 12b are essentially enclosed. The heat exchanger 12b through which the nitrogen charged with solvent residues is passed is essentially covered with a liquid 12e. A space 12d above the intermediate medium 12e remains free. Liquid nitrogen is passed through the heat exchanger 12a via the conduit 104, which nitrogen vaporizes during the exchange of heat in the heat exchanger 12a and leaves the cryogenic apparatus 12 via the conduit 106.

In the region 102', 98b of the heat exchanger 12b there again is available a two-phase mixture consisting of very pure nitrogen and condensed solvent. The container 13 normally is a pressure vessel.

The function of the component of the invention according to FIG. 3 is described as follows: The bottom part of the pressure vessel 13 is filled with a liquid 12e, e.g. freons R12 and R22. The tubes of the heat exchanger 12b lead through this liquid; the nitrogen/solvent mixture flows through these tubes. The tubes of the heat exchanger 12a are led through the upper part 12d of the pressure vessel 13, in which tubes the liquid nitrogen vaporizes. Those tubes of the heat exchanger 12b leading through the bottom part of the vessel 13 are supplied with nitrogen of a temperature of e.g. −30° C. In the heat exchanger 12b there takes place a cooling to e.g. −90° C. The enthalpy produced by the cooling is conveyed to the surrounding liquid 12e which thereby vaporizes partially. The vapor rises to the upper part 12d of the pressure vessel 13 and there is condensed again by means of enthalpy withdrawal by evaporating nitrogen passed through the heat exchanger 12a. The drops forming fall to the bottom and keep constant the level of the liquid 12e in the bottom portion of the vessel 13.

Since heat is transferred in both the bottom and the top portions of the vessel 13 with changing the state of aggregation high heat transfer values are realized. Therefore, the cryogenic apparatus 12 may be constructed accordingly small. A pump 12c is not necessary.

We claim:

1. Solvent recovery apparatus as for manufacturing apparatuses of web-like materials comprising a drier for the removal of solvents from a product by using an inert gas;
   at least one inlet transfer chamber and at least one outlet transfer chamber for the drier;
   a heat exchanger in which solvent-charged gas is precooled;
   a condenser in which the precooled gas is freed from the majority of the solvent;
   a solvent separator; and
   a cryogenic apparatus which is operated with the inert gas as a liquid;
   wherein a first portion of the inert gas is recirculated into the heat exchanger downstream of the solvent separator via a line and is heated against the flow of the inert gas from the drier in order to subsequently resupply the first portion into the drier; and
   wherein a second portion of the gas is supplied into the cryogenic apparatus downstream of the solvent separator to be freed from solvent residues, to be supplemented at least partially with some vaporizing portion of an inert gas to subsequently produce in the transfer chambers a positive gas flux both to the interior of the drier and to the outside;
   in which said cryogenic apparatus comprises a first heat exchanger in which the enthalpy necessary for vaporizing the liquid inert gas and for heating the vaporized inert gas is derived from a liquid refrigerant, and a second heat exchanger which vaporizes the refrigerant deriving the enthalpy necessary for reheating the refrigerant from the solvent-charged gas which thus is cooled down to a necessary, predetermined temperature, a carrier circuit allowing the refrigerant to circulate between the first and the second heat exchangers.

2. Apparatus according to claim 1, in which the carrier circuit consists of an enclosed vessel which essentially includes the first and the second heat exchangers.

3. Apparatus according to claim 1, in which the refrigerant essentially covers the second heat exchanger.

4. Apparatus according to claim 3, in which the enthalpy necessary for vaporizing the liquid inert gas is derived from the refrigerant by means of condensation and the refrigerant liquefied thereby again vaporizes due to receiving enthalpy from the gas to be purified, whereby the gas can be cooled down to the required, predetermined temperature.

5. Apparatus according to claim 1, in which the temperature of the refrigerant is kept constant or nearly constant upon contact with the first heat exchanger by means of controlling the supply of the liquid inert gas.

6. Apparatus according to claim 1, in which the temperature of the gas exiting from the first heat exchanger is kept constant or nearly constant by controlling the supply of the liquid inert gas in the first heat exchanger.

7. Apparatus according to claim 1, in which circulation of the liquid refrigerant is effected by a thermal buoyancy force or by means of back-dropping.

8. Process for the recovery of solvents as for manufacturing apparatus of web-like materials in which a solvent-charged gas is withdrawn from a drier, the solvent-charged gas is prepurified of solvents and the prepurified gas is resupplied to the drier, wherein the gas resupplied to the drier corresponds to a larger portion of the gas withdrawn from the drier; a smaller portion of the withdrawn and prepurified gas is additionally purified in a cryogenic apparatus, and is mixed with an inert gas not yet used in the drier, wherein the gas mixture of cryogenically purified gas and non-used gas is supplied to transfer chambers disposed upstream and downstream of the drier, and wherein due to the difference between the gas withdrawn from the drier and the resupplied larger portion a positive mass flow out of the transfer chambers and both into the drier and into the external atmosphere is adjusted, which essentially corresponds to the cryogenic, purified smaller portion;
   in which said solvents are removed from the smaller portion by contacting liquid nitrogen with a refrigerant medium, such that any enthalpy difference is taken up by the refrigerant medium, whereby the liquid nitrogen vaporizes and the refrigerant medium is liquified thereby to come into contact with the smaller portion, whereby solvent residues are condensed in the smaller portion and the refrigerant medium is vaporized again at least partially.

9. Process according to claim 8, in which Freon R12 or R22 is used as the refrigerant medium.

10. Process according to claim 8, in which the supply of liquid nitrogen controls at least one of the temperature of the refrigerant medium and its transition speed from the liquid phase into the gaseous phase.

* * * * *